Patented July 27, 1937

2,088,308

UNITED STATES PATENT OFFICE 2,088,308

DETERGENT COMPOSITION

Walther Schrauth, Berlin-Dahlem, Germany, assignor, by mesne assignments, to "Unichem" Chemikalien Handels A.-G., Zurich, Switzerland, a corporation of Switzerland No Drawing. Application July 14, 1933, Serial No. 680,462. In Germany July 15, 1932

2 Claims. (Cl. 87—5)

The sulfates and sulfonates of higher molecular aliphatic alcohols in a solid or liquefied form have found a manifold employment in the textile industry as substitutes for soap, since they offer the particular advantage of evoking no separations of lime and magnesium soaps in the fibre.

Now it has been found that for the common washing purposes, principally in the household, one can obtain excellent preparations in the form of pieces, ribbons, flakes, needles, vermicelli, etc. in working up conjointly and homogeneously the alkali salts of sulphuric acid reaction products of higher molecular saturated and unsaturated fatty alcohols, obtainable, for example, according to the patent application filed February 2, 1933, Serial Number 654,879, (for instance on the soap-mill) until compact soap preparations are arrived at. It is thereby possible to obtain hard pieces of a high gloss which are not only resistant to the lime and magnesium salts of the water for washing but also of an extraordinary lathering efficiency when used in a strongly saliferous water, particularly in sea-water. This effect is obtained by working up homogeneously the sulphuric acid reaction products of higher molecular saturated fatty alcohols, neutralized with soda or caustic soda, together with those of an unsaturated character and in pressing them after that into pieces or other shapes for the daily use. In this specification the term higher molecular alcohols will include all alcohols ranging from 6 to 20 carbon atoms both saturated and unsaturated.

The alcohols may be sulfated and/or sulfonated by treating them at room or elevated temprature and, if desired, in the presence of suitable diluents and catalysts, with sulfonating or sulfating agents which besides highly concentrated sulfuric acid or chloro-sulfonic acid preferably contain acid anhydrides capable of binding water. Such acid anhydrides are, for instance, sulfuric anhydride, acetic anhydride and phthalic anhydride. Suitable diluents are in the first place such as are inert to the action of sulfuric acid under the working conditions, as, for instance, nitrobenzene or carbon tetrachloride, and suitable dehydrating catalysts are, for instance, phosphoric anhydride, sodium pyrophosphate, activated carbon or the like.

When treating saturated higher alcohols with sulfuric acid or chloro-sulfonic acid with or without an anhydride, and with or without a catalyst the reaction occurs at the hydroxyl (OH) group of the alcohol to form a sulfuric acid ester or a sulfonic acid, but when treating unsaturated alcohols, a reaction may occur also at the double bond especially at low temperatures e. g. —10 to 10° C., and especially if the hydroxyl group is first protected by esterification with a lower molecular aliphatic acid such for example, as acetic acid. The reaction at the double bond is more probably a sulfating at one carbon atom with the addition of a hydrogen atom at the other carbon atom. At the hydroxyl (OH) group sulfation is more probable at higher temperatures, especially at 30 to 40° C. There are certain advantages in treating the alcohol at a temperature approximating its melting point.

When treating the fuming sulfuric acid or sulfur-trioxide, especially in the presence of an anhydride, the probability of formation of sulfonic acid by substitution of the sulfonic acid group ($SO_2OH$) for the hydroxyl group and its attachment directly to the carbon atom is greater than when treating with sulfuric or chloro-sulfonic acid.

In the sulfation of unsaturated fatty alcohols such as oleyl alcohol by reaction at the double bond it is desirable to use very low temperatures preferably below 10° C., and probably best results would be obtained at temperatures approximating —5° C., in order to form the sulfuric acid ester by reaction at the double bond. Probably it is necessary in order to insure reaction at the double bond to fix the hydroxyl group as by acylating or more especially acetylating the alcohol, before the sulfating step. This can be accomplished, for example, by esterifying the unsaturated alcohol with acetic anhydride at a temperature approximating 130 to 140° C. The temperature should be gradually increased until no more acetic acid distills off. After the ester thus formed has been sulfated and/or sulfonated by further treatment, as for example, with chloro-sulfonic acid at a higher temperature preferably above 30° C., thereby splitting off the acetic acid and substituting the sulfuric acid radical. The best temperature for the reaction is between 30° C. and 40° C. It will be noted that this process produces a di-sulfate containing a larger proportion of sulfur than is found in the sulfated monovalent saturated alcohols. The sodium or other alkali metal salts of this disulfate provide excellent soaps and wetting-out agents.

The sulfates and sulfonates above described may be neutralized not only with sodium or other alkali metals but with organic bases such as piperidine, cyclohexylamine, triethanolamine. The alcohols may be sulfonated separately or the saturated and unsaturated alcohols may be mixed and then sulfonated jointly, if desired.

The ground soap preparations of the alkali salts of the sulphonated fatty alcohols can be used especially as washing-mediums on sea-steamers and for people living on the sea-coast, since the products as claimed in this application possess an excellent lathering capacity in sea-water and are moreover quite indifferent to the skin. By these properties they are particularly distinguished from the cocoanut-oil soaps hitherto employed as sea-water soaps.

Example 1

A particularly practicable mixture for the manufacturing of such sea-water soaps contains 53 parts by weight of a commercial mixture consisting of about an equal number of parts by weight of the sodium salt of the sulphuric acid ester of the unsaturated oleyl alcohol (iodine number 85) and of the sodium salt of the sulphuric acid esters of saturated aliphatic alcohols with 16 or 18 carbon atoms respectively, 40 parts by weight of the sodium salt of the sulphuric acid ester of the lauryl alcohol and 7 parts by weight of curd soap. This mixture is carefully mixed on the soap-mill, whereby one can perfume at the same time according to what is wanted. The mass can easily be pressed to hard and glossy pieces, but it can also be worked up to flakes, ribbons, needles, vermicelli and the like with the corresponding working mechanisms. Products which consist only of the sulphonated products of saturated or unsaturated fatty alcohols do not allow of being shaped and the pieces obtained in pressing them are mean-looking, brittle and in use they fall to dust.

Example 2

For the manufacture of the new soap preparations one may also proceed in the following manner: 40 parts by weight of technical oleyl alcohol with the saponification number 38, which corresponds to a fatty alcohol content of about 80%, and the iodine number 45, indicating about 50% of saturated fatty alcohols, are sulphonated with 30 parts by weight of 96% sulphuric acid at 30 to 35° C., and the reaction product is neutralized with 50 parts by weight of a 33% solution of caustic soda. Then 70 parts by weight of the sodium salt of the sulphuric acid ester of the fatty alcohols obtainable by reducing cocoa oil are added whereupon one stirs thoroughly. After a two days' storing the mixture can be ground and pressed to pieces, threads or the like.

Example 3

For making cakes, flakes and other formed pieces a particularly suitable composition may be produced by combining 2 parts of the sulfates and/or sulfonates of fatty alcohol produced by the reduction of the fatty acids obtained from cocoanut oil and 2 parts of the sulfates and/or sulfonates of a mixture of approximately equal parts of the saturated and unsaturated alcohols having chiefly 16 and 18 carbon atoms in the molecule. Formed pieces may be produced from this composition alone or soap up to 20% of the weight of the sulfates and/or sulfonates may be added.

It is to be noted that the examples indicate generally that the proportion of sulfates and/or sulfonates of the unsaturated alcohols tend to approximate one-third by weight of the sulfates and/or sulfonates of the saturated alcohols.

The term "sulfonate" as found in the claims is used in the broad sense to include both the sulfates and the true sulfonates.

The term "thread-like pieces" is used in the claims as a clearly non-alternative expression to define the forms mentioned in the specification as ribbons, needles, vermicelli and the like.

What I claim is:—

1. A detergent in the form of molded pieces comprising approximately 53% of the sulfonates of a mixture of approximately equal parts of oleyl alcohol and saturated alcohol having chiefly 16 and 18 carbon atoms in the molecule, 40% of the sulfonates of the mixture of alcohols produced by the reduction of the fatty acids obtainable from cocoanut oil and 7% of curd soap.

2. A detergent in the form of fine thread-like pieces consisting of approximately two parts by weight of the sulfonates of the mixture of alcohols produced by the reduction of the fatty acids obtainable from cocoanut oil and two parts of the sulfonates of a mixture of approximately equal parts of the saturated and unsaturated fatty alcohols having chiefly 16 and 18 carbon atoms in the molecule.

WALTHER SCHRAUTH.